(12) United States Patent
Pearson et al.

(10) Patent No.: US 9,173,181 B1
(45) Date of Patent: Oct. 27, 2015

(54) ADAPTER THAT CONVERTS PRECISION TIME PROTOCOL (PTP) TO GLOBAL POSITIONING SYSTEM (GPS)

(71) Applicant: Sprint Communications Company L.P., Overland Park, KS (US)

(72) Inventors: Timothy Hugh Pearson, Overland Park, KS (US); Seng Gan, Ashburn, WA (US); Henry Burford, Leesburg, VA (US); Eric C. English, Lees Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 167 days.

(21) Appl. No.: 13/949,992

(22) Filed: Jul. 24, 2013

(51) Int. Cl.
*H04B 7/14* (2006.01)
*H04W 56/00* (2009.01)

(52) U.S. Cl.
CPC .................................. *H04W 56/001* (2013.01)

(58) Field of Classification Search
None
See application file for complete search history.

(56) References Cited

U.S. PATENT DOCUMENTS

| | | | |
|---|---|---|---|
| 8,976,750 B1* | 3/2015 | Pearson et al. | 370/329 |
| 2004/0203865 A1* | 10/2004 | Krasner | 455/456.1 |
| 2005/0259514 A1* | 11/2005 | Iseli et al. | 367/79 |
| 2006/0049982 A1* | 3/2006 | Wells | 342/357.1 |
| 2008/0280624 A1* | 11/2008 | Wrappe | 455/456.1 |
| 2008/0297407 A1* | 12/2008 | Fenton | 342/357.03 |
| 2009/0029645 A1* | 1/2009 | Leroudier | 455/7 |
| 2009/0054075 A1* | 2/2009 | Boejer et al. | 455/456.1 |
| 2009/0143018 A1* | 6/2009 | Anderson et al. | 455/67.11 |
| 2009/0168843 A1* | 7/2009 | Waters et al. | 375/130 |
| 2009/0179792 A1* | 7/2009 | Remondi | 342/357.04 |
| 2009/0276542 A1* | 11/2009 | Aweya et al. | 709/248 |
| 2010/0046553 A1* | 2/2010 | Daigle et al. | 370/474 |
| 2011/0028166 A1* | 2/2011 | Ketchum et al. | 455/456.5 |
| 2011/0039578 A1* | 2/2011 | Rowitch et al. | 455/456.1 |
| 2011/0221485 A1* | 9/2011 | He et al. | 327/144 |
| 2012/0063415 A1* | 3/2012 | Yee | 370/331 |
| 2012/0094594 A1* | 4/2012 | Rofougaran et al. | 455/15 |
| 2012/0182835 A1* | 7/2012 | Davis et al. | 367/118 |
| 2012/0196646 A1* | 8/2012 | Crinon et al. | 455/524 |
| 2012/0302287 A1* | 11/2012 | Wright | 455/556.1 |
| 2014/0218248 A1* | 8/2014 | Schulz et al. | 343/761 |
| 2014/0219162 A1* | 8/2014 | Eyuboglu et al. | 370/315 |

\* cited by examiner

*Primary Examiner* — Gregory Sefcheck
*Assistant Examiner* — Jael Ulysse

(57) ABSTRACT

A method and apparatus are provided for converting a precision time protocol (PTP) to a GPS signal. Enterprise versions of Femtocells are located within buildings and do not have access to a GPS signal directly from a GPS satellite. An adapter is provided that takes an available PTP and power over Ethernet (PoE) flow and converts the signal into a pseudo-GPS signal that acts as a timing input into the Femtocell. The pseudo-GPS signal is a GPS signal modulated at the L1 band frequency or 1575.42 megahertz, but does not have location data nor subframes 1, 2, or 3, as found in an ordinary GPS signal.

13 Claims, 6 Drawing Sheets

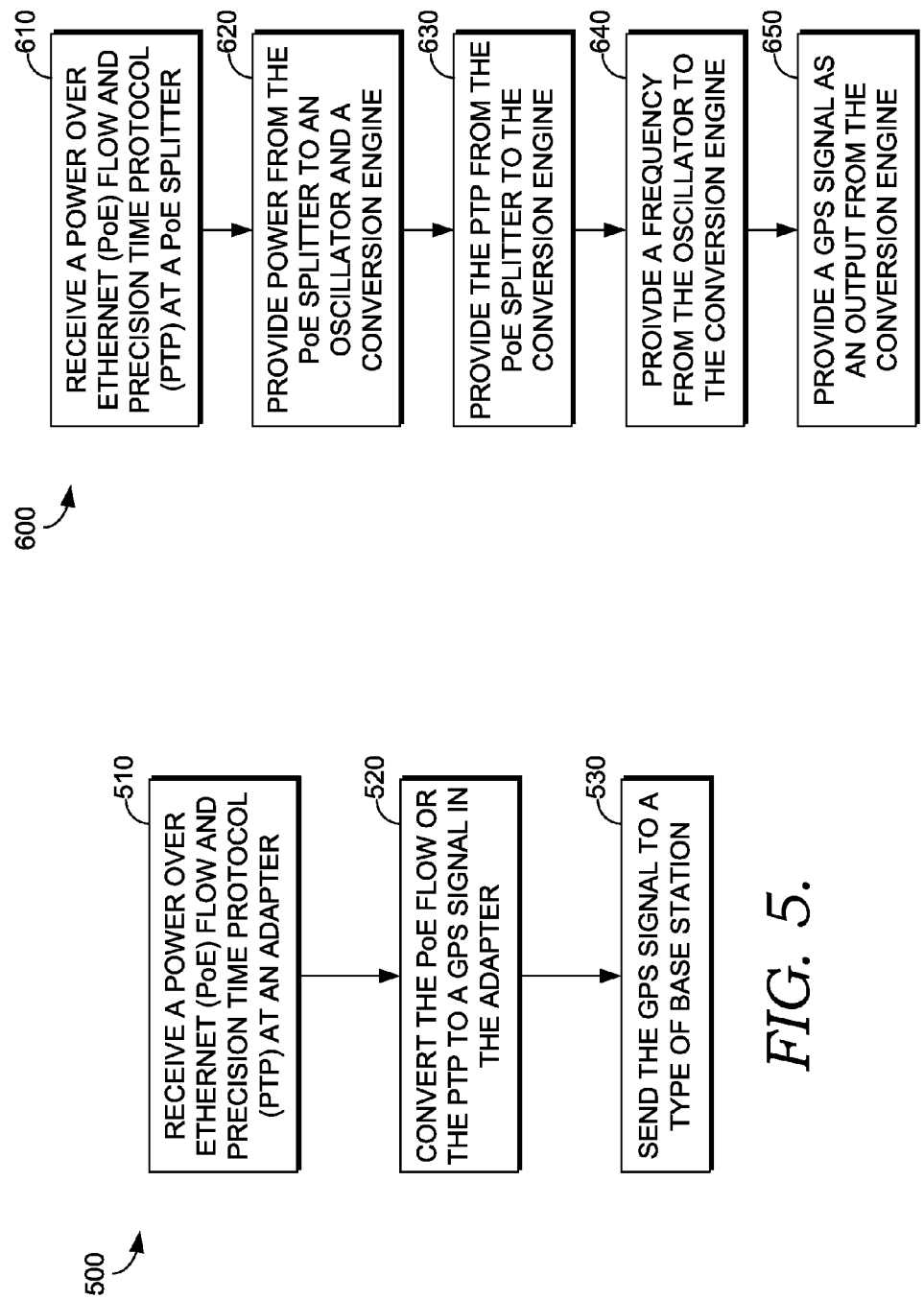

ADAPTER THAT CONVERTS PRECISION TIME PROTOCOL (PTP) TO GLOBAL POSITIONING SYSTEM (GPS)

CROSS-REFERENCE TO RELATED APPLICATIONS

Not applicable.

BACKGROUND OF THE INVENTION

When certain types of base stations, such as a femtocell or picocell, are deployed in a building, it is difficult to provide a GPS signal to the base station. For example, femtocells usually need a GPS input in order to maintain a frequency and phase synchronization. Even with a lack of clear line of sight for GPS, picocells may be in jeopardy of maintaining proper synchronization even though they may not require a direct GPS input. Femtocells and picocells may be deployed together or deployed separately in a network. Typically, femtocells are base stations that handle voice communications in a network. Picocells are base stations that handle data communications in the network.

When femtocells are deployed within a building, using the GPS signal as a synchronization source, it may be costly if GPS distribution is needed. This problem becomes acute especially with the deployment of a particular type of femtocell called an eFemto or enterprise femtocell because multiple femtocells are required on various floors. eFemtos or enterprise femtocells can be found deployed in businesses or non-residential buildings. However, femtocells can be deployed in either a residence or commercial environment. The majority of femtocells will be deployed in an enterprise area. With a large number of femtocells being deployed, a solution is needed that would allow a GPS input to be provided to the femtocell when deployed beyond the clear line of sight of a GPS signal, such as in a building.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to a method and apparatus for relaying a Global Positioning System signal using Ethernet cable. When a Grand Master Clock provides clock synchronization over an Ethernet cable, precision time protocol is modulated over Ethernet to a device destination. At the same time, power is also modulated over the same Ethernet to the device destination. Precision time protocol and power are intercepted at an adapter or converter. A conversion from PTP to a Global Positioning System signal occurs, and the Global Positioning System signal is sent as input into a femtocell or picocell.

BRIEF DESCRIPTION OF THE SEVERAL VIEWS OF THE DRAWINGS

Illustrative embodiments of the present invention are described in detail below with reference to the included drawing figures, wherein:

FIG. 5 is a process for relaying a Global Positioning System signal using an Ethernet cable, implemented in accordance with an embodiment of the present invention;

FIG. 6 is another process for relaying a Global Positioning System signal using an Ethernet cable, implemented in accordance with an embodiment of the present invention.

DETAILED DESCRIPTION

Figure 1:
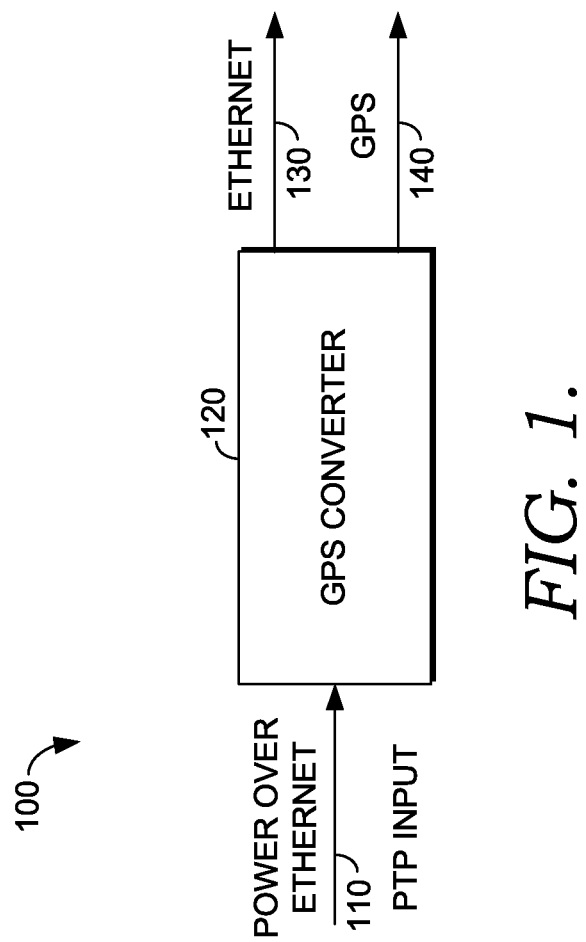
FIG. 1 is an exemplary illustration of a Global Positioning System (GPS) converter implemented in accordance with an embodiment of the present invention.

Embodiments of the present invention relate generally to a method and apparatus for converting an Ethernet packet-based synchronization into a global positioning system (GPS) signal when the GPS signal is unavailable from a GPS satellite. An adapter receives a precision time protocol (PTP) and power over Ethernet (PoE) flow, performs a conversion, and outputs a GPS signal modulated on the L1 band frequency (1575.42 megahertz). The adapter also outputs data on an Ethernet cable.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

DC Direct Current
GPS Global Positioning System
IEEE Institute of Electrical and Electronics Engineers
IPv4 Internet Protocol version 4
IPv6 Internet Protocol version 6
PLL Phase Lock Loop
PoE Power over Ethernet
PPS Pulse per second
PTP Precision Time Protocol
RF Radio Frequency
UDP User Datagram Protocol Further, various technical terms are used throughout this description. A definition of such terms can be found in *Newton's Telecom Dictionary* by H. Newton, 27th Edition (2013). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, apparatus, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

PTP to GPS Converter Device

Embodiments of the present invention disclose a method and apparatus for receiving inputs at a terminal adapter and allowing the terminal adapter to subsequently deliver a GPS signal to a femtocell or picocell. This terminal adapter may also be used for other network elements that could benefit from its ability to convert PTP to GPS which does not require location data.

In a first aspect, a method for relaying a GPS signal using an Ethernet cable is provided that includes receiving a PoE flow and a PTP at an adapter. The PoE flow or the PTP is converted to a GPS signal in the adapter. The GPS signal is sent to a type of base station, such as a femtocell or picocell. The GPS signal may be a pseudo-GPS signal that includes a L1 band frequency but does not include location data nor subframes, 1, 2, or 3.

In another aspect, an apparatus for creating a GPS signal using an Ethernet cable is provided. A PoE splitter receives a PoE flow and a PTP. The PoE splitter provides power to an oscillator and a conversion engine, and provides the PTP to the conversion engine. The oscillator provides a frequency to the conversion engine. The conversion engine provides a GPS signal, and may also provide an Ethernet output. The conversion engine may also stabilize the frequency and phase in the oscillator.

In yet another aspect, a conversion engine converts an Ethernet signal to a GPS signal. A PTP stack receives a PTP over Ethernet. The PTP stack sends a one pulse per second signal and a 10.23 megahertz signal to a controller, and provides an Ethernet output. A phase lock loop provides a corrective phase alignment from the controller to an oscillator. The controller receives a power signal, receives a frequency from the oscillator, and receives the one pulse per second signal and the 10.23 megahertz signal from the PTP stack. The controller provides a GPS signal.

In FIG. 1, a conversion system 100 is shown with an input 110 entering into a converter 120. Input 110 is an Ethernet cable that includes power that runs over Ethernet (PoE). Input 110 also includes a precision time protocol (PTP) that runs over Ethernet. PoE can be embodied in various ways. One embodiment that is implemented allows for power to travel over the Ethernet cable in compliance with a standard, such as IEEE 802.3af or IEEE 802.3at. Other embodiments can be implemented with power traveling over Ethernet that may not comply with any standard. PTP is a protocol that is used to synchronize clocks in a network. PTP is implemented in accordance to IEEE 1588 protocol or another clock synchronization protocol. PTP can be transported over various physical layers. In the embodiment here, PTP is transported over Ethernet, also known as PTP over IEEE 802.3 or PTP over Ethernet. PTP can also be found in implementations such as PTP over UDP over IPv4 and PTP over UDP over IPv6.

Converter 120 is a mechanism that converts PTP into a form of GPS signal. In some embodiments, converter 120 performs a conversion and provides an Ethernet output 130 and a GPS output 140. Although not shown, converter 120 may include a processor and a memory. Ethernet output 130 represents data that travels over Ethernet. GPS output 140 represents a form of GPS signaling, a type of a so-called pseudo-GPS signal such as an L1 band frequency modulated at 1575.42 megahertz but does not contain location data or sub-frames 1, 2, or 3. Location data would include position latitude and longitude. L1 is one of several bands of frequencies in GPS. As mentioned earlier, the L1 band frequency is 1575.42 MHz. L2 band frequency is 1227.60 MHz. L3 band frequency is 1381.05 MHz. L4 band frequency is 1379.913 MHz. L5 band frequency is 1176.45 MHz. Additional information about GPS frequencies and the use of frequencies in each band may be found elsewhere beyond the scope of this discussion.

Going back to power over Ethernet, PoE describes systems that pass electrical power along with data on Ethernet cabling. The cable can provide both data and electrical power. At a certain point, the data and power can be separated. While power travels over Ethernet, PTP can also travel over the same Ethernet. In some embodiments, PTP uses Ethernet as the transport protocol. In other embodiments, PTP uses UDP as the transport protocol either in IPv4 or IPv6.

Figure 2:
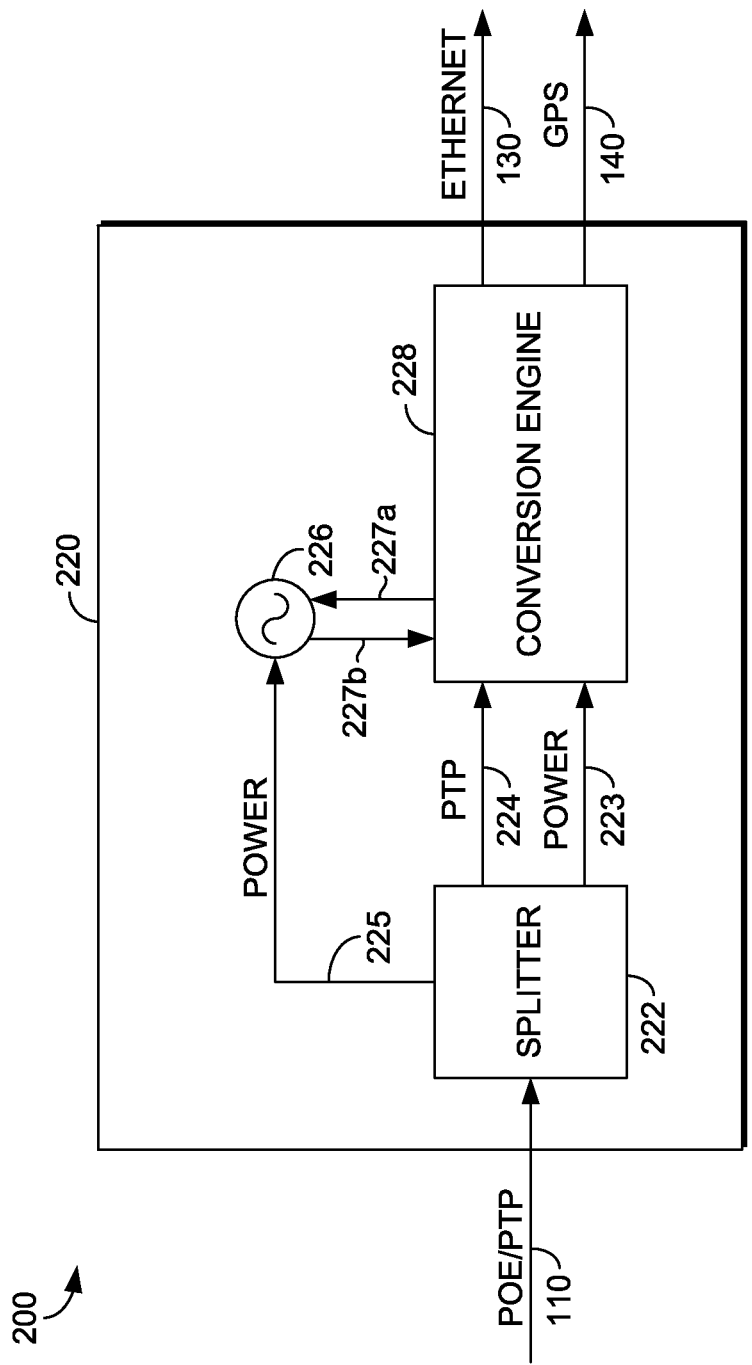
FIG. 2 is an exemplary illustration of a Precision Time Protocol (PTP) to Global Positioning System (GPS) converter implemented in accordance with an embodiment of the present invention.

Turning now to FIG. 2, a conversion system 200 is shown with a converter 220 receiving power and PTP over an Ethernet cable at 110. In FIG. 1, the power and PTP over Ethernet cable was represented by input 110, and is the same here. Power and PTP are received into a splitter 222. Splitter 222 strips the direct current (DC) power from the PoE source. Splitter 222 also provides power 223 and 225 to an oscillator 226 and a conversion engine 228. Splitter 222 passes PTP represented by PTP 224 to conversion engine 228. PTP 224 may be PTP over Ethernet as defined by IEEE 1588.

Oscillator 226 provides a stable source of frequency in conversion engine 228. An exemplary oscillator implemented in the present invention is a crystal oscillator. However, with other implementations, other oscillators may also be employed depending on the stability or hold-over required. Such oscillators could include a rubidium oscillator, cesium oscialltor, or hydrogen maser oscillator. With oscillator 226, a loop is established between oscillator 226 and conversion engine 228 represented by 227a and 227b. This loop enables oscillator 226 to maintain a proper phase with the frequency.

Within conversion engine 228, PTP 224 is transformed so that conversion engine provides data over Ethernet cable 130 and provides a type of GPS signal over GPS output 140. In an exemplary embodiment, conversion engine 228 can include a PTP stack, phase lock loop, servo control of the oscillator, a subset of the GPS navigation message, and an up counter to the GPS L-band.

Figure 3:
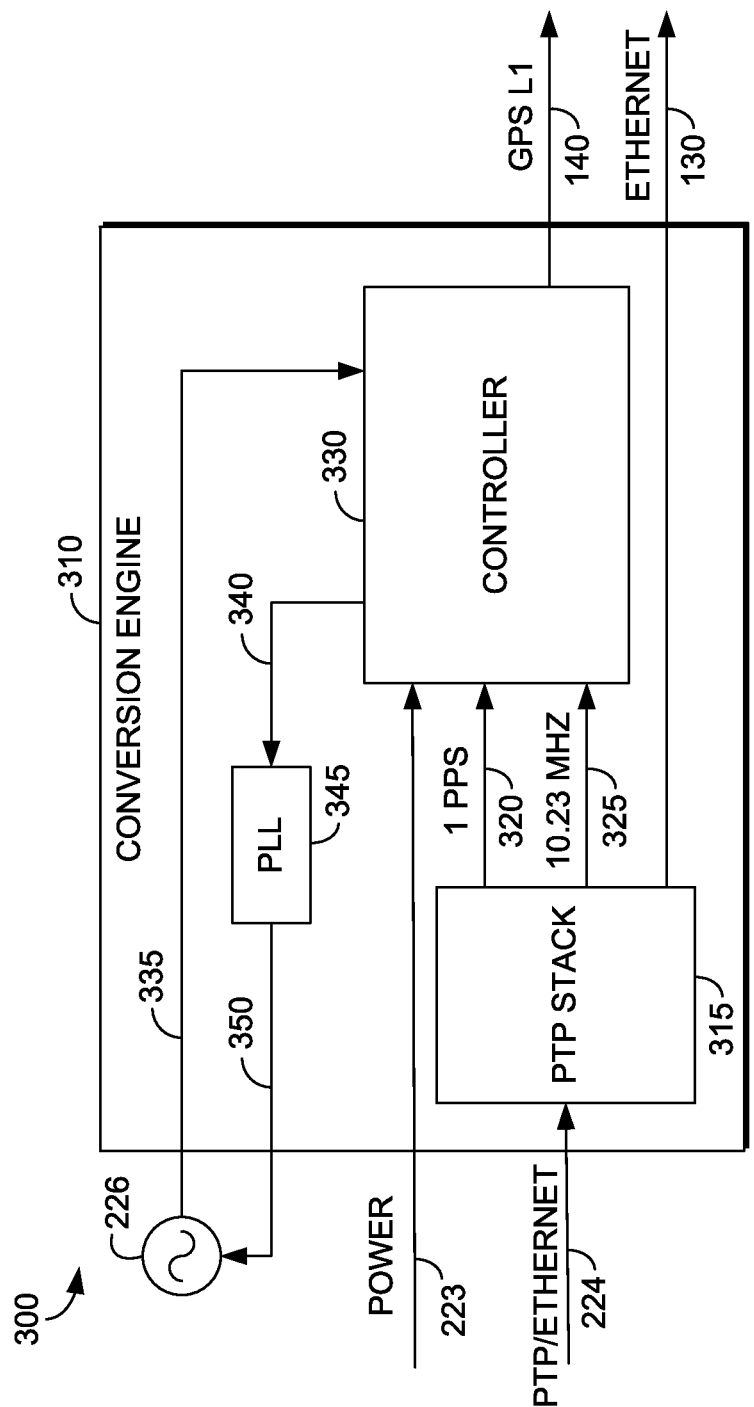
FIG. 3 is an exemplary illustration of a conversion engine implemented in accordance with an embodiment of the present invention.

In FIG. 3, a conversion system 300 is shown with a conversion engine 310.

Power is provided to conversion engine 310 at power 223. PTP travels over an Ethernet transport represented by PTP 224. PTP 224 is received into a PTP stack 315, which is located in conversion engine 310. PTP stack 315 sends one pulse per second (1 PPS) 320 to a controller 330. Further, PTP stack 315 sends a 10.23 megahertz frequency (325) to controller 330. Particularly, PTP stack 315 converts PTP into two outputs, 1 PPS and 10.23 MHz. Even further, PTP stack 315 forwards Ethernet frames out of conversion engine 310 as Ethernet output 130.

Power 223 is delivered into conversion engine 310 to controller 330. Controller 330 provides servo control of oscillator 226. Controller 330 and oscillator 226 work together to maintain a proper phase alignment and maintain stable frequency. Located between controller 330 and oscillator 226, phase lock look (PLL) 345 is used to keep oscillator 226 in the correct phase. PLL 345 provides a corrective phase alignment from controller 330. A loop is formed between controller 330, PLL 345, and oscillator 226 with 335, 340, and 350. Controller 330 uses the 1PPS (320), PLL 345, and oscillator 226 to continually stabilize the phase.

Controller 330 also uses the 10.23 MHz (325) along with power 223 to create a type of GPS signal shown as GPS output 140. In many embodiments, controller 330 has a pseudo L1 modulator that adds the GPS navigation satellite message to the Coarse/Acquisition (C/A) code. This GPS navigation satellite message is usually subframe 4 as defined by the standard. The GPS signal is an up counter to the GPS L-band. In embodiments, this GPS signal is a type of pseudo-GPS signal. The GPS signal is a pseudo-GPS signal because it only contains the subset of the GPS navigation messages identified as subframe 4, and does not have location data such as latitude and longitude nor does it have sub-frames 1, 2, and 3. L1 band represents a modulated frequency of 1575.42 megahertz or 10.23 megahertz multiplied by 154.

Figure 4:
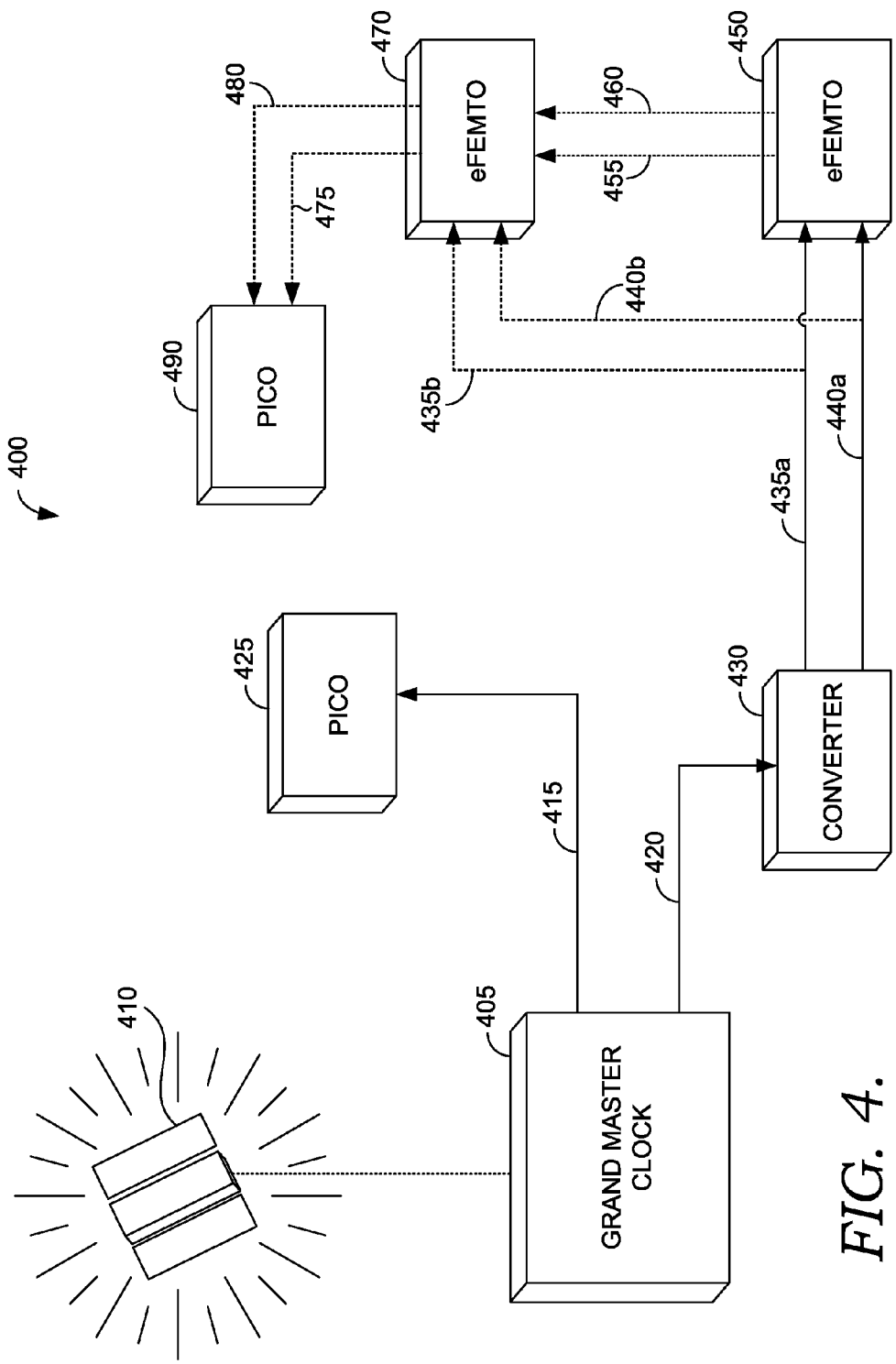
FIG. 4 is an exemplary illustration of a system that provides GPS-to-PTP-to-GPS conversion in accordance with an embodiment of the present invention.

Turning now to FIG. 4, a system 400 is shown with GPS satellite 410 that sends a GPS signal and is received by a Grand Master Clock 405, which is equipped with a GPS receiver. Grand Master Clock 405 receives the GPS signal and provides PoE and PTP over Ethernet at input 415 to a picocell 425. As mentioned earlier, PoE is power over Ethernet and is PTP distributed over Ethernet transport. PoE is implemented according to IEEE 802.3af and IEEE 802.3at. PTP is implemented according to IEEE 1588. Grand Master Clock 405 also provides PoE and PTP at input 420 to a converter 430. Converter 430 is a representative embodiment of systems 100, 200, and 300 shown respectively in FIGS. 1, 2, and 3. As discussed in FIGS. 1, 2, and 3, converter 430 provides data over Ethernet at Ethernet output 435a and 435b. Converter 430 also provides an L1 band GPS signal over GPS output 440a and 440b.

In an exemplary embodiment in FIG. 4, eFemto 450 and eFemto 470 can receive respectively Ethernet output 435a and 435b and GPS output 440a and 440b. This embodiment enables eFemtos 450 and 470 to overcome limitations of being placed in a building beyond a clear line of sight of a GPS signal from a GPS satellite, such as GPS satellite 410. eFemtos 450 and 470 are capable of receiving a GPS signal for clock synchronization despite being located within a building structure.

Likewise, in another implementation of embodiment of the present invention, eFemto 450 can act as the initial recipient of Ethernet output 435a and a pseudo-GPS output 440a. Upon reception of this data and GPS signal, eFemto 450 can forward data over Ethernet output 455 to eFemto 470 by means of bridges, while the GPS signal is sent as GPS output 460 to the same eFemto 470 by means of splitters. Further, this configuration can be implemented where a picocell is also located within the building structure. Although an implementer can configure an eFemto and picocell in various ways, eFemto 470 can provide a data connection over Ethernet output 475 to picocell 490, which may be located in the building. eFemto 470 can provide GPS output 480 to picocell 490 if needed.

One of ordinary skill in the art knows that various configurations can be implemented to get a clock synchronization signal from a grand master clock to any number of femtocells and picocells. Implementations of embodiments of the present invention enable converter 430 to provide a pseudo GPS signal based on the GPS source from the Grandmaster over Ethernet to a femtocell. Ethernet is used rather than radio frequency (RF) because the cost savings are significant. Ethernet cabling is needed for access and is an embedded expense of deployment. With the implementation of each eFemto, an approximate cost saving of $1,500 can be achieved using Ethernet versus RF. As thousands of femtocells are deployed in a network, the cost savings become dramatic for a service provider.

In FIG. 5, a process for relaying a GPS signal using an Ethernet cable is implemented in a method 500. In a step 510, PoE flow and PTP are received over input 110 or input 420 at an adapter, converter 120, or converter 430. PoE flow or the PTP is converted a pseudo GPS signal in the adapter, converter 120, or converter 430, in a step 520. Particularly, the data from the PoE flow is passed through the adapter, converter 120, or converter 430. In a step 530, the pseudo GPS signal is delivered over GPS output 140 or GPS output 440a to a type of base station, such as eFemto 450.

Turning now to FIG. 6, another process for converting a GPS signal from a PTP frame is implemented in a method 600. In a step 610, PoE flow and PTP are received at PoE splitter 222. Power 225 is provided from PoE splitter 222 to oscillator 226, in a step 620. Power 223 is provided from PoE splitter 222 to conversion engine 228, in step 620. In a step 630, PTP 224 is provided from PoE splitter 222 to conversion engine 228. A frequency is provided from oscillator 226 to conversion engine 228, in a step 640. In a step 650, a GPS signal is provided as pseudo-GPS output 140 from conversion engine 228.

Figure 7:
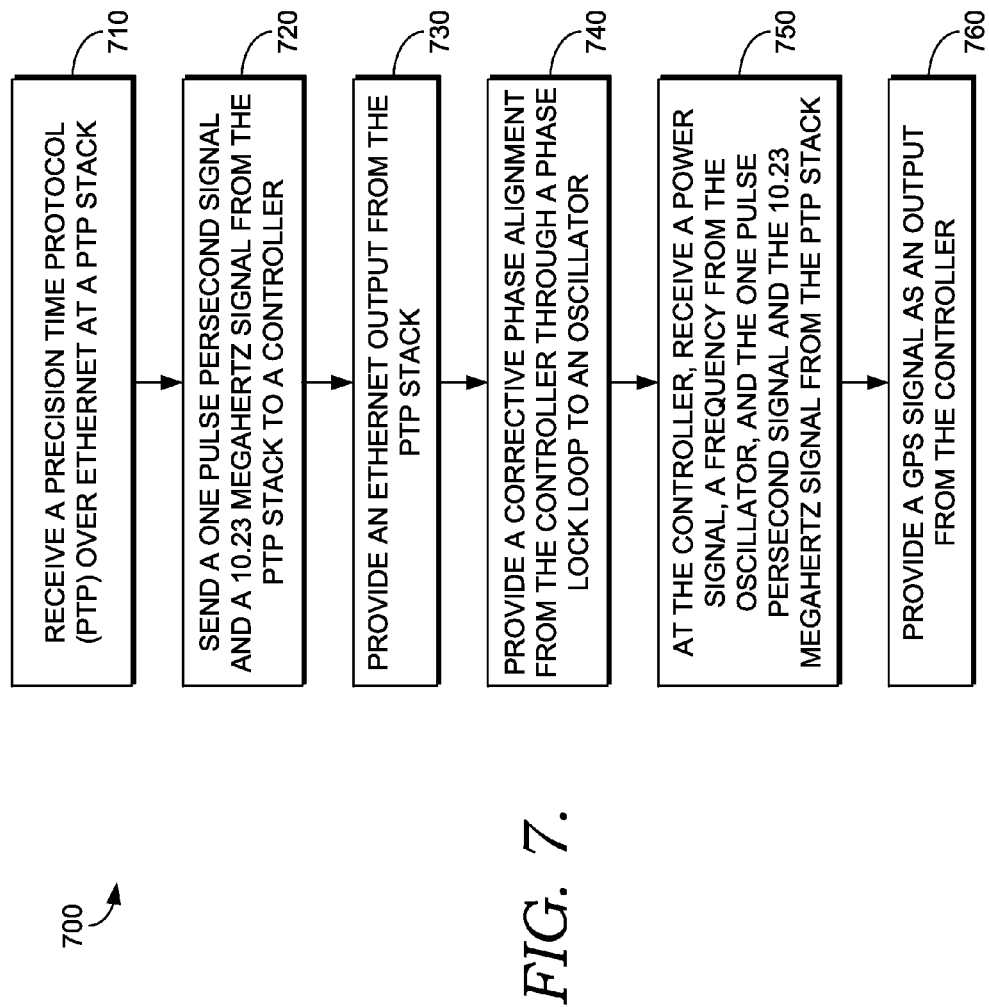
FIG. 7 is a process for converting an Ethernet signal to a Global Positioning System signal, implemented in accordance with an embodiment of the present invention.

In FIG. 7, a process for converting an Ethernet signal to a pseudo-GPS signal is shown in a method 700. In a step 710, PTP 224 is received at PTP stack 315. One pulse per second (1 PPS) 320 and a 10.23 megahertz frequency 325 are sent from PTP stack 315 to controller 330, in a step 720. In a step 730, PTP stack 315 provides Ethernet at Ethernet output 130. In a step 740, controller 330 provides a corrective phase alignment through PLL 345 to oscillator 226. Controller 330 receives power 223, which could be PoE. Controller 330 also receives a frequency from oscillator 226, and receives 1 PPS 320 and 10.23 megahertz frequency 325 from PTP stack 315, in a step 750. In a step 760, controller 330 provides a pseudo-GPS signal that has been modulated up to the L1 band frequency as pseudo-GPS output 140.

As one of ordinary skill in the art knows, an implementation of the embodiment of the present invention allows femtocells and picocells to be deployed within building structures. Clock synchronizations can still be provided from a grandmaster clock over an Ethernet cable. The converter device will enable thousands of femtocells to be deployed without concern for a clear line of sight of a GPS signal from a GPS satellite in internal coax cabling, GPS splitters, and GPS repeaters.

Many different arrangements of the various components depicted, as well as components not shown, are possible without departing from the spirit and scope of embodiments of the present invention. Embodiments of the present invention have been described with the intent to be illustrative rather than restrictive. Alternative embodiments will become apparent to those skilled in the art. A skilled artisan may develop alternative means of implementing the aforementioned improvements without departing from the scope of the present invention.

Certain features and subcombinations are of utility and may be employed without reference to other features and subcombinations and are contemplated to be within the scope of the claims. Not all steps listed in the various figures need be carried out in the specific order described.

The invention claimed is:

1. A method for relaying a global positioning system (GPS) signal using an Ethernet cable, comprising:
    receiving a power over Ethernet (PoE) flow and a precision time protocol (PTP) at an adapter;
    converting at least one of the PoE flow or the PTP to the GPS signal in the adapter; and
    sending the GPS signal to a type of base station, wherein the GPS signal includes a L1 band frequency but does not include location data and subframes 1, 2, or 3.

2. The method of claim 1, wherein sending the GPS signal comprises sending the GPS signal to at least one of a femtocell or picocell.

3. An apparatus for creating a global positioning system (GPS) signal using an Ethernet cable, comprising:
    a power over Ethernet (PoE) splitter that receives a PoE flow and a precision time protocol (PTP);
    the PoE splitter that provides power to an oscillator and a conversion engine, and that provides the PTP to the conversion engine;
    the oscillator that provides a frequency to the conversion engine; and
    the conversion engine that provides the GPS signal, wherein the GPS signal is a pseudo-GPS signal, which is the GPS signal with a L1 band frequency but without location data and subframes 1, 2, or 3.

4. The apparatus of claim 3, wherein the conversion engine provides the GPS signal to a type of base station.

5. The apparatus of claim 4, wherein the type of base station is at least one of a femtocell or a picocell.

6. The apparatus of claim 5, wherein the conversion engine also provides an Ethernet output.

7. The apparatus of claim 3, wherein the conversion engine stabilizes a phase to the oscillator.

8. A conversion engine for converting an Ethernet signal to a GPS signal, comprising:
    a precision time protocol (PTP) stack that receives a PTP over Ethernet;
    the PTP stack that sends a one pulse per second signal and a 10.23 megahertz signal to a controller, and that provides an Ethernet output;
    a phase lock loop that provides a corrective phase alignment from the controller to an oscillator;
    the controller that receives a power signal, receives a frequency from the oscillator, and receives the one pulse per second signal and the 10.23 megahertz signal from the PTP stack; and
    the controller that provides the GPS signal, wherein the GPS signal is a pseudo-GPS signal, which is the GPS signal with a L1 band frequency but without location data and subframes 1, 2, or 3.

9. The conversion engine of claim 8, wherein the controller includes a servo control of the oscillator, and pseudo L1 modulator.

10. The conversion engine of claim 9, wherein the servo control of the oscillator uses the one pulse per second signal and the frequency to stabilize the phase.

11. The conversion engine of claim 10, wherein the controller provides the GPS signal to a type of base station.

12. The conversion engine of claim 11, wherein the type of base station is at least one of a femtocell or a picocell.

13. The conversion engine of claim 8, wherein the PTP stack provides an Ethernet output.

* * * * *